United States Patent
Roh et al.

(10) Patent No.: US 8,380,433 B2
(45) Date of Patent: Feb. 19, 2013

(54) LOW-COMPLEXITY TIGHTLY-COUPLED INTEGRATION FILTER FOR SENSOR-ASSISTED GNSS RECEIVER

(75) Inventors: June Chul Roh, Plano, TX (US); Deric W. Waters, Dallas, TX (US); Srinath Hosur, Plano, TX (US); Goutam Dutta, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 643 days.

(21) Appl. No.: 12/568,084

(22) Filed: Sep. 28, 2009

(65) Prior Publication Data

US 2010/0079334 A1    Apr. 1, 2010

Related U.S. Application Data

(60) Provisional application No. 61/100,325, filed on Sep. 26, 2008, provisional application No. 61/099,631, filed on Sep. 24, 2008.

(51) Int. Cl.
*G01C 21/10* (2006.01)
*H04B 7/185* (2006.01)

(52) U.S. Cl. ........ 701/505; 701/500; 701/501; 701/507; 701/509; 701/511; 342/352; 73/1.77

(58) Field of Classification Search .................. 701/500, 701/505, 472, 468–470, 473, 474, 479, 489, 701/51, 511, 515, 110, 207, 220, 213, 214, 701/501, 507, 509; 73/1.77, 1.78, 1.38; 342/352, 342/357.2, 357.3
See application file for complete search history.

(56) References Cited

U.S. PATENT DOCUMENTS

| | | | |
|---|---|---|---|
| 2002/0111717 A1* | 8/2002 | Scherzinger et al. | 701/1 |
| 2004/0102900 A1* | 5/2004 | Ibrahim et al. | 701/215 |
| 2007/0010936 A1* | 1/2007 | Nordmark et al. | 701/200 |

* cited by examiner

*Primary Examiner* — Thomas Tarcza
*Assistant Examiner* — Adam Tissot
(74) *Attorney, Agent, or Firm* — Steven A. Shaw; W. James Brady; Frederick J. Telecky, Jr.

(57) ABSTRACT

Embodiments of the invention provide a blending filter based on extended Kalman filter (EKF), which optimally integrates the IMU navigation data with all other satellite measurements tightly-coupled integration filter. This blending filter can be easily implemented with minor modification to the position engine of stand-alone GNSS receiver. Provided is a low-complexity tightly-coupled integration filter for sensor-assisted global navigation satellite system (GNSS) receiver. The inertial measurement unit (IMU) contains inertial sensors such as accelerometer, magnetometer, and/or gyroscopes Embodiments also include method for pedestrian dead reckoning (PDR) data conversion for ease of GNSS/PDR integration. The PDR position data is converted to user velocity measured at the time instances where GNSS position/velocity estimates are available.

32 Claims, 7 Drawing Sheets

LOW-COMPLEXITY TIGHTLY-COUPLED INTEGRATION FILTER FOR SENSOR-ASSISTED GNSS RECEIVER

CROSS-REFERENCE TO RELATED APPLICATIONS

This application claims priority under 35 U.S.C. §119(e) to U.S. Provisional Application No. 61/100,325, filed on Sep. 26, 2008. This application is related to U.S. Provisional Application No. 61/099,631, filed on Sep. 24, 2008, Non-Provisional application Ser. No. 12/565,927, filed Sep. 24, 2009, entitled DETECTING LACK OF MOVEMENT TO AID GNSS RECEIVERS. This application is related to co-pending U.S. patent application Ser. No. 12/394,404, filed on Feb. 27, 2009, entitled METHOD AND SYSTEM FOR GNSS COEXISTENCE. All of said applications incorporated herein by reference.

BACKGROUND

Embodiments of the invention are directed, in general, to communication systems and, more specifically, to sensor assisted GNSS receivers.

Any satellite-based navigation system suffers significant performance degradation when satellite signal is blocked, attenuated and/or reflected (multipath), for example, indoor and in urban canyons. As MEMS technologies advance, it becomes more interested to integrate sensor-based inertial navigation system (INS) solutions into global navigation satellite system (GNSS) receivers, in pedestrian applications as well as in vehicle applications.

As GNSS receivers become more common, users continue to expect improved performance in increasingly difficult scenarios. GNSS receivers may process signals from one or more satellites from one or more different satellite systems. Currently existing satellite systems include global positioning system (GPS), and the Russian global navigation satellite system (Russian: ГЛОНАСС, abbreviation of ГЛОбальная НАвигационная Спутниковая Система; tr.: GLObal'naya NAvigatsionnaya Sputnikovaya Sistema; "GLObal NAvigation Satellite System" (GLONASS). Systems expected to become operational in the near future include Galileo, quasi-zenith satellite system (QZSS), and the Chinese system Beidou. For many years, inertial navigation systems have been used in high-cost applications such as airplanes to aid GNSS receivers in difficult environments. One example that uses inertial sensors to allow improved carrier-phase tracking may be found in A. Soloviev, S. Gunawardena, and F. van Graas, "Deeply integrated GPS/Low-cost IMU for low CNR signal processing: concept description and in-flight demonstration," *Journal of the Institute of Navigation*, vol. 55, No. 1, Spring 2008; incorporated herein by reference. The recent trend is to try to integrate a GNSS receiver with low-cost inertial sensors to improve performance when many or all satellite signals are severely attenuated or otherwise unavailable. The high-cost and low-cost applications for these inertial sensors are very different because of the quality and kinds of sensors that are available. The problem is to find ways that inexpensive or low-cost sensors can provide useful information to the GNSS receiver.

Low-cost sensors may not be able to provide full navigation data. Or they may only work in some scenarios. In the past, most integration techniques for GNSS receivers and sensors assumed the sensors constituted a complete stand-alone navigation system or that its expensive components allow it to give precise measurements. Low-cost sensors cannot always allow for these assumptions. In addition, traditionally the INS is assumed to be fully calibrated, which is not always possible.

What is needed is low-complexity GNSS/IMU integration apparatus and methods to improve GNSS performance in harsh environments such as indoors, parking garages, deep urban canyons, and the like.

SUMMARY

In light of the foregoing background, embodiments of the invention provide a blending filter based on extended Kalman filter (EKF), which optimally integrates the IMU navigation data with all other satellite measurements (tightly-coupled integration filter). This blending filter may be implemented with modification to the position engine of a stand-alone GNSS receiver.

Disclosed is a low-complexity tightly-coupled integration filter for sensor-assisted GNSS receiver. The inertial measurement unit (IMU) contains inertial sensors such as accelerometer, magnetometer, and/or gyroscopes.

Most other solutions take INS as the baseline and integrate the GNSS data (GNSS-assisted INS). In contrast, our intention is to maintain the structure of the GNSS position engine (EKF) as much as possible while integrating the sensor-based navigation data.

The advantages of the proposed integration filter include:
  Minimum modification to the position engine of stand-alone GNSS receiver. Only one, two, or three more rows (depending on configuration) are added in the measurement equation of GNSS-only extended Kalman filter (EKF). It is important to note that no new states are necessary in the EKF. The sensor information is incorporated only via new measurements.
  Highly flexible allowing smooth transitions between GNSS-only, GNSS/IMU, and IMU-only configurations, covering various signal conditions.
  The position information obtained from IMU is optimally integrated as one of many available measurements.

Therefore, the system and method of embodiments of the invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Figure 1:
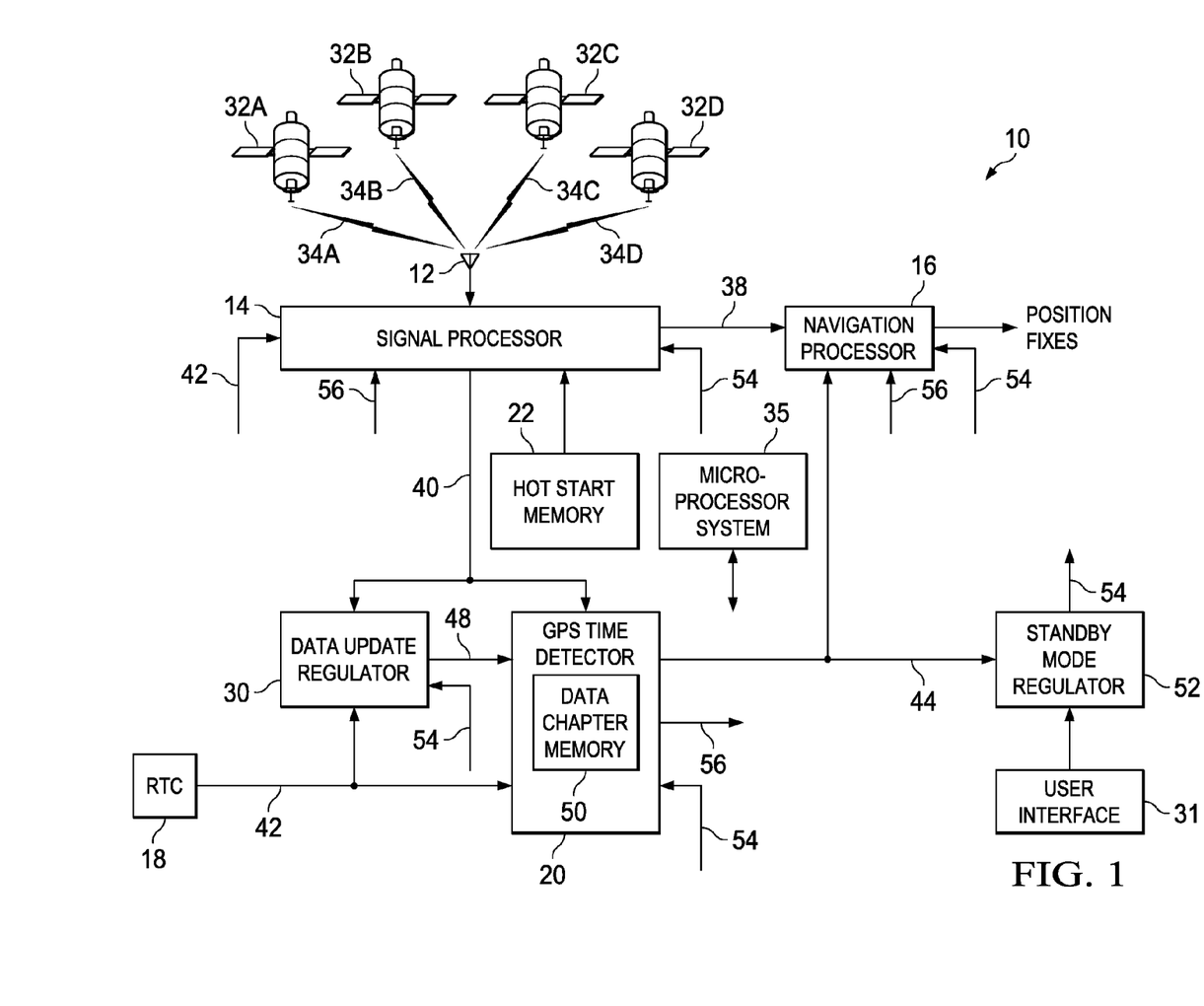
FIG. 1 is a block diagram of a global positioning system (GPS) receiver known in the art.

FIG. 1 is a block diagram of a global positioning system (GPS) receiver 10 known in the art. The GPS receiver 10 includes a GPS antenna 12, a signal processor 14, a navigation processor 16, a real time clock (RTC) 18, a GPS time detector 20, a hot start memory 22, a data update regulator 30 and a user interface 31. GPS signal sources 32A-D broadcast respective GPS signals 34A-D. The GPS signal sources 32A-D are normally GPS satellites. However, pseudolites may also be used. For convenience the GPS signal sources 32A-D are referred to as GPS satellites 32 and the GPS signals 34A-D are referred to as GPS signals 34 with the understanding that each of the GPS signals 34A-D is broadcast separately with separate GPS message data for each of the GPS signal sources 32A-D. A global navigation satellite system (GNSS) signal source and signal may be used in place of the GPS signal sources 32 and GPS signals 34. The receiver is described in the context of processing GPS signals, but can be used in the context of processing signals from any satellite system.

In order to more easily understand the embodiments of the invention, the structural elements of the best mode of the invention are described in terms of the functions that they perform to carry out the invention. It is to be understood that these elements are implemented as hardware components and software instructions that are read by a microprocessor in a microprocessor system 35 or by digital signal processing hardware to carry out the functions that are described.

The GPS antenna 12 converts the GPS signals 34 from an incoming airwave form to conducted form and passes the conducted GPS signals to the signal processor 14. The signal processor 14 includes a frequency down-converter; and carrier, code and data bit signal recovery circuits. The frequency down-converter converts the conducted GPS signals to a lower frequency and digitizes the lower frequency GPS signals to provide digital GPS signals. The signal recovery circuits operate on the digital GPS signals to acquire and track the carrier, code and navigation data bits for providing respective timing signals 38 and GPS data bit streams 40 for each of the GPS satellites 32. Parallel processing of the respective digital GPS signals is preferred so that the timing signals 38 and the data bit streams 40 are determined in parallel for several GPS satellites 32, typically four or more. The timing signals 38 generally include code phase, code chip timing, code cycle timing, data bit timing, and Doppler tuning.

The timing signals 38 are passed to the navigation processor 16 and the data bit streams 40 are passed to the GPS time detector 20 and the data update regulator 30. The GPS time detector 20 uses GPS clock time estimates 42 from the RTC 18 and the data bit streams 40 for determining a true GPS clock time 44 and passes the true GPS clock time 44 to the navigation processor 16. The navigation processor 16 includes a pseudorange calculator and a position detector using the timing signals 38 and the GPS clock time 44 for determining pseudoranges between the GPS antenna 12 and the GPS satellites 32 and then using the pseudoranges for determining a position fix. The navigation processor 16 passes the GPS clock time and position to the user interface 31.

The data update regulator 30 passes a specified collection 48 of data bits of the GPS data bit streams 40 to a data chapter memory 50 within the GPS time detector 20 for updating a block of GPS message data in the chapter memory 50. The user interface 31 may include keys, a digital input/output capability and a display for enabling a user to operate the GPS receiver 10 and view results of the operation of the GPS receiver 10. In general the user interface 31 is coupled through the microprocessor system 35 to each of the other elements of the GPS receiver 10.

The GPS receiver 10 also includes a standby mode regulator 52. The standby mode regulation 52 controls the GPS receiver 10 through control signals 54 to have an operation mode and a standby mode. The GPS receiver 10 may be directed to enter the standby mode at any time from the user interface 31.

In the operation mode, the GPS receiver 10 acquires the GPS signals 34 and determines a true GPS clock time 44; and uses the GPS clock time 44 for determining a two or three dimensional position fix. If time only is required, the GPS receiver 10 returns to the standby mode without determining the position fix. During the standby mode, the GPS receiver 10 reduces its power consumption and maintains standby data, including its position, in the hot start memory 22 for a state of readiness. The standby data includes the last known GPS time and position of the GPS receiver 10. Data for GPS ephemeris and almanac orbital parameters 56 is stored in the hot start memory 22 or the chapter memory 50.

When the GPS receiver 10 enters the operation mode after a time period in the standby mode, the signal processor 14 uses the GPS clock time estimates 42, the almanac or ephemeris parameters and the standby data for quickly providing the signal timing signals 38 and the data bit stream 40. The navigation processor 16 uses the GPS clock time 44, the stored ephemeris parameters, and the timing signals 38 in order to compute a first position fix for what is known as a hot start fast time to first fix (TTFF). The microprocessor system 35 is interconnected for controlling the signal processor 14, navigation processor 16, real time clock (RTC) 18, GPS time detector 20, hot start memory 22, data update regulator 30, user interface 31, data chapter memory 50 and standby mode regulator 52. The functions of the signal processor 14, navigation processor 16, real time clock (RTC) 18, GPS time detector 20, hot start memory 22, data update regulator 30, user interface 31, data chapter memory 50 and standby mode regulator 52 are implemented by the microprocessor 35 according to programmed software instructions on one or more computer readable mediums or by digital signal processing hardware or by a combination.

Position Engine of Stand-Alone GNSS Receiver

Described below is the extended Kalman filter (EKF) functioning as the position engine of stand-alone GNSS receiver. Although the EKFs discussed here have 8 states, all the GNSS/IMU integration methods that will be proposed in this invention can be also applied to

- any other EKF structures if the state includes the user velocity, and
- EKFs in which the state is defined in a coordinate system other than earth-centered earth-fixed (ECEF). For example, the position state elements could be in latitude, longitude, and altitude.

The state for the 8-state EKF is defined as follows $$x = [x, y, z, -ct_u, \dot{x}, \dot{y}, \dot{z}, -c\dot{t}_u)_s]^T \quad (1)$$

where x,y,z and $\dot{x},\dot{y},\dot{z}$ are 3-dimensional user position and velocity, respectively, in ECEF coordinate system. $t_u$ and $\dot{t}_u$ represents the clock bias and the clock drift; and c is the speed of light.

System Equation:

$$x_k = Ax_{k-1} + w_k \quad (2)$$

$$A = \begin{bmatrix} 1 & 0 & 0 & 0 & T & 0 & 0 & 0 \\ 0 & 1 & 0 & 0 & 0 & T & 0 & 0 \\ 0 & 0 & 1 & 0 & 0 & 0 & T & 0 \\ 0 & 0 & 0 & 1 & 0 & 0 & 0 & T \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (3)$$

where T is the sample time (i.e., time difference between two successive state vectors $x_{k-1}$ and $x_k$); and $w_k$ models the process noise and is assumed to be $w_k \sim N(0, Q_k)$ (which means that $w_k$ is a Gaussian random vector with zero-mean and covariance $Q_k$).

Measurement Equation:

$$z_k = h_k(x_k) + v_k \quad (4)$$

where $v_k$ is the measurement noise vector, assumed to be $v_k \sim N(0, R_k)$. The dimension of $z_k$ changes depending on the number of measurements that are combined in the position engine. For each satellite, typically up to two kinds of measurements may contribute to the measurement equation (4): pseudorange measurements and delta range measurements. That is, the two kinds of measurements are populated in vector $z_k$ in (4), and the corresponding elements of $h_k(x_k)$ model the pseudorange and the delta range as functions of the current EKF state with a known satellite position. Although not discussed here, other measurements are also possible, but do not change the overall measurement equation. For example, altitude constraints can be introduced as measurement equations.

The nonlinear measurement model (4) is linearized at the current state.

$$z_k = H_k x_k + v_k \quad (5)$$

Each row of the measurement matrix $H_k$ is determined in terms of direction cosines of the unit vector pointing from the user position to the satellite. For example, when the number of satellites is four, the measurement equation is as follows:

$$\begin{bmatrix} \rho_1 \\ \rho_2 \\ \rho_3 \\ \rho_4 \\ \dot{\rho}_1 \\ \dot{\rho}_2 \\ \dot{\rho}_3 \\ \dot{\rho}_4 \end{bmatrix} = \begin{bmatrix} a_{x1} & a_{y1} & a_{z1} & 1 & 0 & 0 & 0 & 0 \\ a_{x2} & a_{y2} & a_{z2} & 1 & 0 & 0 & 0 & 0 \\ a_{x3} & a_{y3} & a_{z3} & 1 & 0 & 0 & 0 & 0 \\ a_{x4} & a_{y4} & a_{z4} & 1 & 0 & 0 & 0 & 0 \\ 0 & 0 & 0 & 0 & a_{x1} & a_{y1} & a_{z1} & 1 \\ 0 & 0 & 0 & 0 & a_{x2} & a_{y2} & a_{z2} & 1 \\ 0 & 0 & 0 & 0 & a_{x3} & a_{y3} & a_{z3} & 1 \\ 0 & 0 & 0 & 0 & a_{x4} & a_{y4} & a_{z4} & 1 \end{bmatrix} \begin{bmatrix} x \\ y \\ z \\ -ct_u \\ \dot{x} \\ \dot{y} \\ \dot{z} \\ -c\dot{t}_u \end{bmatrix} + \begin{bmatrix} v_x \\ v_y \\ v_z \\ v_{ct_u} \\ v_{\dot{x}} \\ v_{\dot{y}} \\ v_{\dot{z}} \\ v_{c\dot{t}_u} \end{bmatrix} \quad (6)$$

where $\rho_i$, and $\dot{\rho}_i$ are the pseudorange and the delta range measurements, respectively, for the i-th satellite. $a_{xi}$, $a_{yi}$, $a_{zi}$, are the x, y, z components of the unit norm vector pointing from the user position to the i-th satellite.

In practice, there may be any number of measurements and each satellite may give only a pseudorange or only a delta range measurement. Sometimes there may not be any available measurements temporarily in which case the predicted state is simply the propagation of the last state. In this description, it is assumed that the measurement engine always provides two measurements for each satellite, but the position engine may discard some measurements. However, the proposed solution can apply to other systems where the measurement engine does not always provide measurements in this way as well.

Then, the standard Extended Kalman Filtering (EKF) equations are followed as are known in the art.

$$\hat{x}_k^- = A\hat{x}_{k-1}^+$$

$$P_k^- = AP_{k-1}^- A^T + Q_k$$

$$K_k = P_k^- H_k^T (H_k P_k^- H_k^T + R_k)^{-1}$$

$$\hat{x}_k^+ = \hat{x}_k^- + K_k[z_k - h_k(\hat{x}_k^-)]$$

$$P_k^+ = (I - K_k H_k) P_k^- \quad (7)$$

GNSS/IMU Integration

Figure 2:
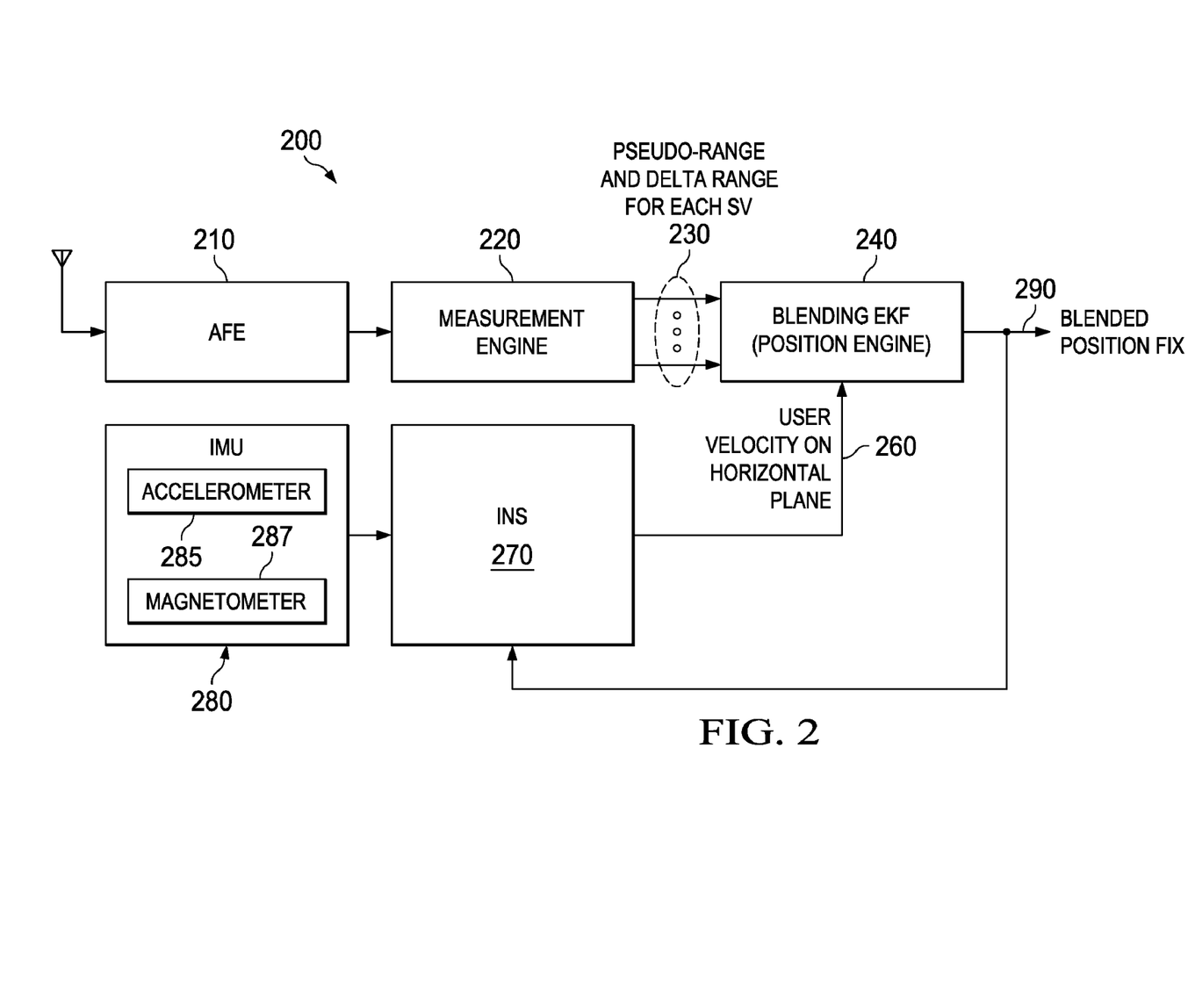
FIG. 2 shows a tightly-coupled GNSS/IMU integration (top-level) for pedestrian applications.

FIG. 2 shows a top-level block diagram for GNSS/IMU integration. Analog front end (AFE) converts analog data to digital data. The GNSS measurement engine 220 provides the blending EKF integration filter 240 with the following 230: pseudorange measurement, delta range measurement for each satellite. The measurement engine can also provide measurement noise variances for the pseudorange measurements and delta range measurements.

The inertial navigation system (INS) 270 or pedestrian dead reckoning (PDR) block calculates navigation information (position and/or velocity 260) using the inertial sensor outputs. The proposed GNSS/IMU integration filter uses the user velocity data from the INS 270 or PDR block. The INS user velocity data may be synchronized to the GNSS measurement samples. Although FIG. 2 shows the IMU 280 with accelerometers 285 and magnetometers 287, this is just an example. The IMU 280 may have other kinds of sensor combinations as well, including gyroscopes, for example. The IMU 280 and/or INS 270 may be calibrated using the blended navigation data 290.

For pedestrian navigation, PDR in the place of INS 270 may be integrated with GNSS receiver. To convert the PDR data to the velocity sampled at the GNSS sample instances, a method for PDR data conversion for ease of GNSS/PDR integration is disclosed below. The PDR position data is converted to user velocity measured at the time instances where GNSS position/velocity estimates are available. With this method, GNSS/PDR integration can be implemented at minimum complexity. Most other solutions do not include PDR data conversion; therefore, the GNSS/PDR blending filter is complicated since it should run at step events (which is generally irregular), or step events+GNSS position updates (usually 1 Hz).

Step Detection

The pedestrian dead reckoning (PDR) system output is integrated with GNSS receiver. An embodiment of the invention includes PDR data conversion method utilizing a signal produced by a step detection algorithm. The step detection algorithm is now described.

Notation: a(k) is a multi-dimensional acceleration vector at k-th sample. Key features of the step detection algorithm include 1. Use the magnitude of accelerometer measurement, |a(k)|. With that, the performance is not dependent on the attitude of IMU or attitude estimation error.
2. Take a low-pass filter to |a(k)|. For example, a simple moving-average filter.

Figure 5:
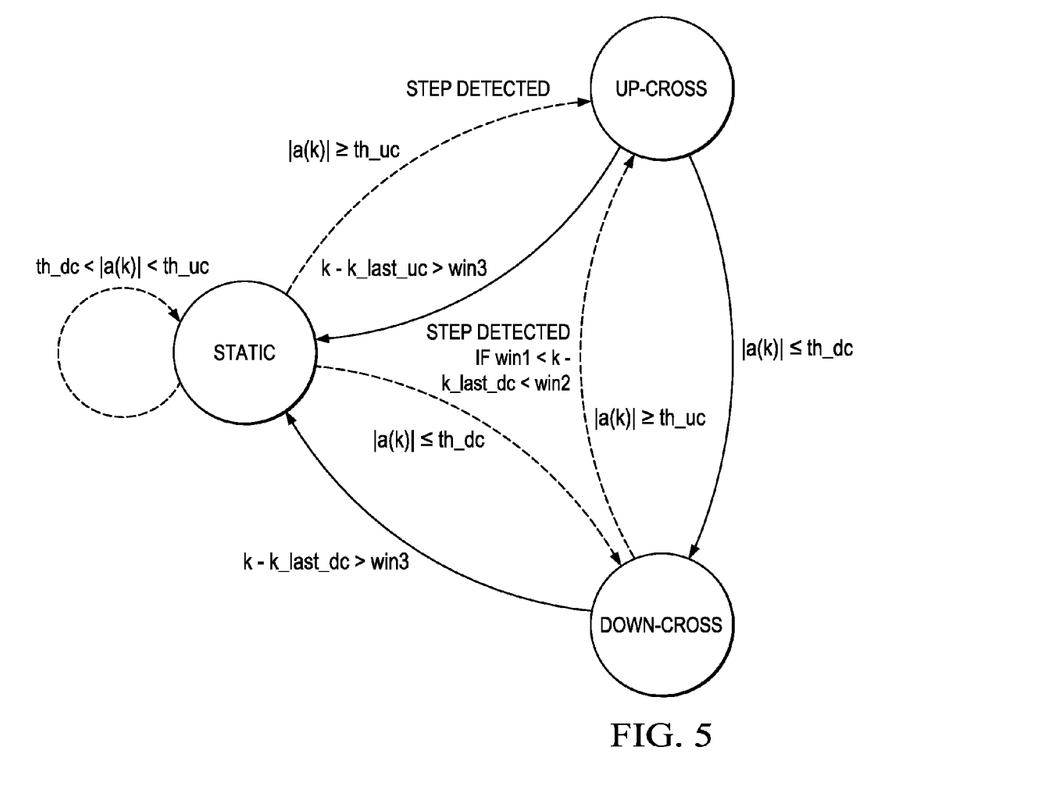
FIG. 5 is a state diagram for step detection.

3. Step detection algorithm:
   a. Two thresholds for down-crossing and up-crossing detection
   b. The algorithm can be seen as a state machine shown in FIG. 5.
      i. Three states: Static, Down-Cross, Up-Cross
      ii. Up- or down-crossing triggers a state transition
      iii. No self-loop in Down-Cross and Up-Cross states: Walking pattern is usually down-crossing followed by up-crossing. And with this, over-counting steps can be avoided.
   c. Timers:
      i. Up-crossing should occur within a time window from the last down-crossing.
      ii. Return to the Static state if there is no up- or down-crossing event for a given time.

The outputs of the PDR systems include the user position and the user velocity both in the horizontal navigation plane (in North-and-East coordinate).

Figure 6:
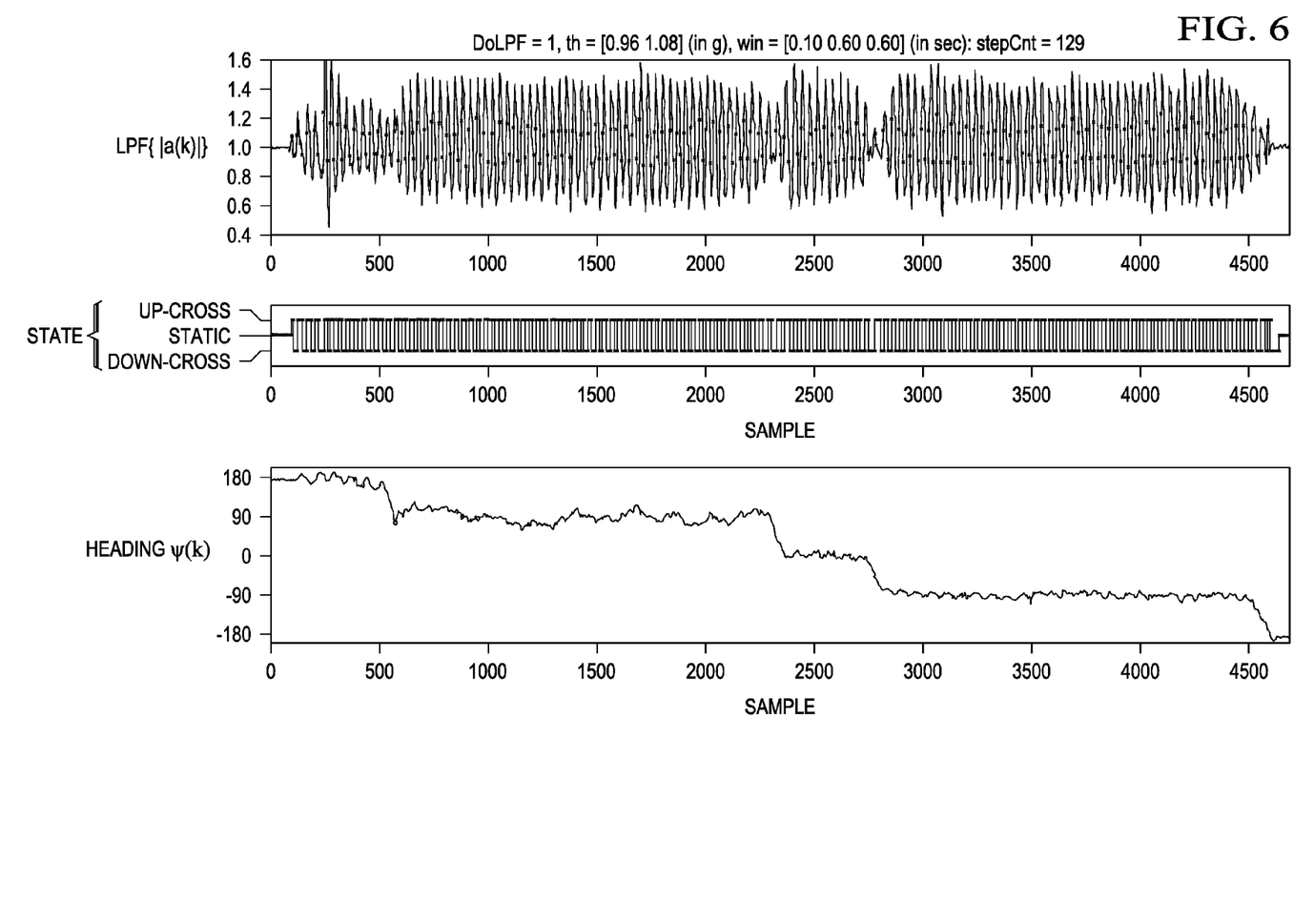
FIG. 6 is a graph showing step detection data.
Figure 7:
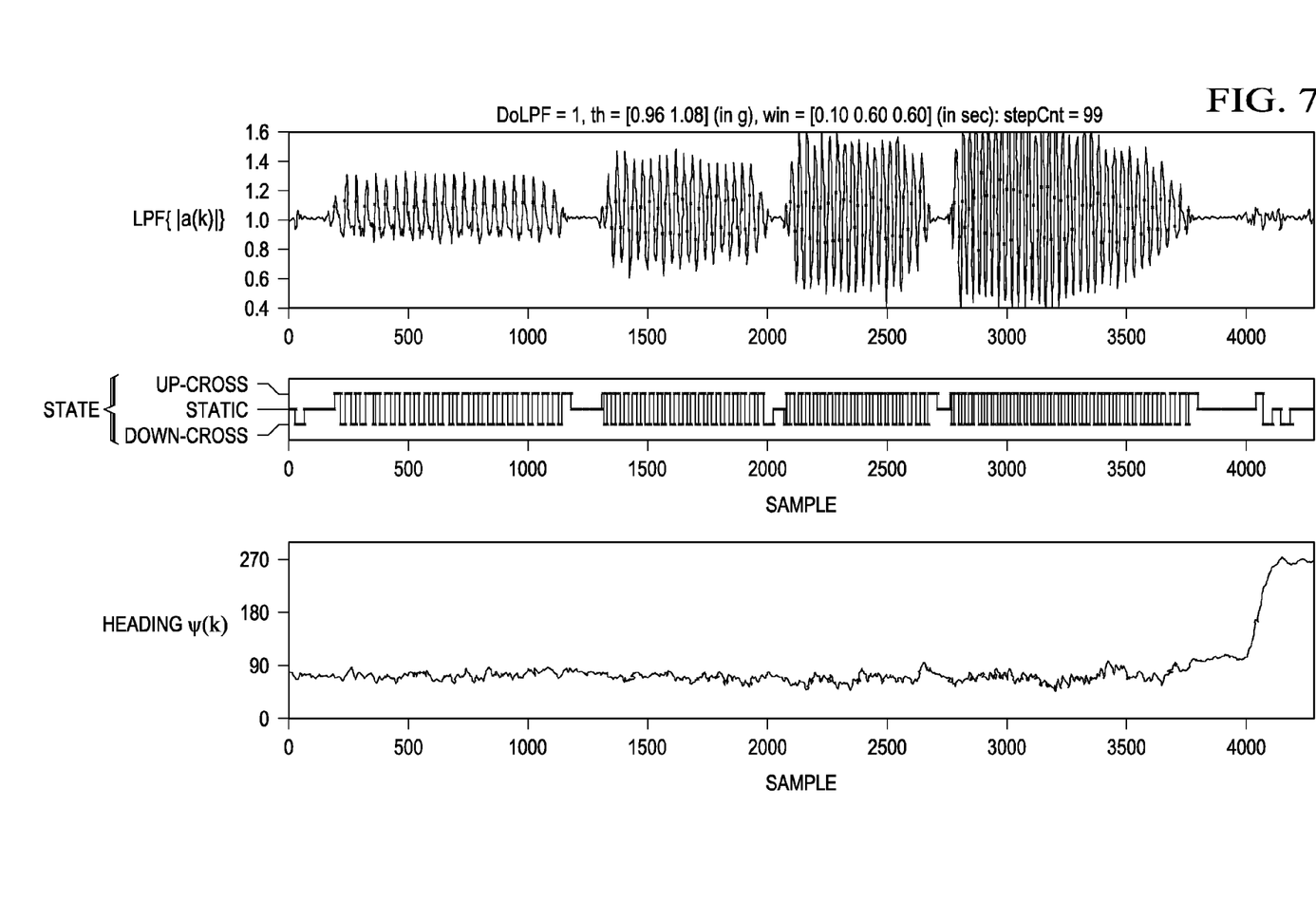
FIG. 7 is a graph showing step detection data for various walking speeds.

FIG. 6 is a graph showing step detection data. Circles represent time instances when steps are detected. FIG. 7 is a graph showing step detection data for various walking speeds. The step-detection state, as can be seen from the state transition plot, captures static/walking status as well as basic pedestrian dynamics.

The PDR position is updated at each step event.

$$p_i = p_{i-1} + l_i \begin{bmatrix} \cos\psi_i \\ \sin\psi_i \end{bmatrix}. \quad (8)$$

where $p_i = p(\tau_i)$ is the 2-dimensional position vector consisted of north and east components at time instance $\tau_i$ when i-th step is detected. $l_i$ is the step length for the step (this can be assumed a constant or can be estimated using the IMU output). $\psi_i$ is the heading (in radian) for the step that is obtained, for example, from IMU (e-compass).

Obtaining the PDR velocity at GNSS clock
1. Find the PDR position at the current GNSS clock, $p(t_k)$, where $t_k$ is the time instance for GNSS measurement:
   If the step detection state is not Static, add a partial step to the last PDR position. The partial step is calculated using the heading and the step interval for the previous step (instead of using unknowns for the unfinished step).
   If the step detection state is Static, the position for the last step is kept (adding no partial step).
2. (Optional) Update the position at the previous GNSS clock, $p(t_{k-1})$, by now doing interpolation with the measured step instances.
3. Take difference between them to have velocity, $$v(t_k) = \frac{1}{t_k - t_{k-1}}[p(t_k) - p(t_{k-1})].$$

Example

Figure 8:
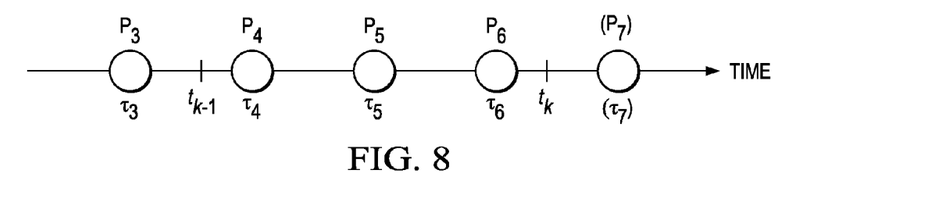
FIG. 8 is a time diagram showing time instances for step events and GNSS clock.

Referring now to FIG. 8 which is a time diagram showing time instances for step events and GNSS clock.
$\tau_i$ denotes time instance when the i-th step is detected.
$t_k$ denotes GNSS clock instance (typically 1 Hz for consumer navigators).

1. If the step detection state is Static, $$p(t_k) = p_6 \quad (9)$$

otherwise, $$p(t_k) = p_6 + \frac{t_k - \tau_6}{\tau_7 - \tau_6} l_7 \begin{bmatrix} \cos\psi_7 \\ \sin\psi_7 \end{bmatrix} \approx p_6 + \min\left(\frac{t_k - \tau_6}{\tau_6 - \tau_5}, 1\right) l_6 \begin{bmatrix} \cos\psi_6 \\ \sin\psi_6 \end{bmatrix}. \quad (10)$$

2. (Optional) If there are at least one step event during the last GNSS clock cycle, update the position for the previous clock as follows $$p(t_{k-1}) = p_3 + \frac{t_{k-1} - \tau_3}{\tau_4 - \tau_3} l_4 \begin{bmatrix} \cos\psi_4 \\ \sin\psi_4 \end{bmatrix}. \quad (11)$$

3. Obtain the PDR velocity $$v(t_k) = \frac{1}{T}[p(t_k) - p(t_{k-1})]. \quad (12)$$

where $T = t_k - t_{k-1}$ is the sample interval for GNSS samples.

GNSS/IMU Integration Filters

The state of the GNSS/IMU integration EKF or integration filter state is the same as in a stand-alone GNSS receiver:

$$x = [x, y, z, -ct_u, \dot{x}, \dot{y}, \dot{z}, -c\dot{t}_u]^T. \quad (13)$$

The same EKF system equation in (2) is reused here, and in order to integrate IMU navigation data only some more rows need to be added to the EKF measurement equation with satellite measurements (pseudorange and delta range for each satellite) kept untouched.

The integration filter processes the user velocity data from the INS in the measurement equation of EKF in one of the following ways:
   (Option A) Three INS measurements in local navigation coordinate (e.g., in north, east, down) may be included in the measurement equation in a way the INS measurements are a function of velocity variables of an integration filter state with a plurality of measurement noises.
   (Option B) Two INS measurements in local navigation coordinate (e.g., in north, east) may be included in the measurement equation in a way the INS measurements are a function of velocity variables of an integration filter state with a plurality of measurement noises.
   (Option C) Same as Option A where three INS measurements in local navigation coordinate (e.g., in north, east, down) may be included in the measurement equation in a way the INS measurements are a function of velocity variables of an integration filter state with a plurality of measurement noises, but the vertical INS measurement may be set to zero.
   (Option D) The INS user velocity may be included in the measurement equation in the form of speed (magnitude of the INS velocity vector on horizontal navigation plane) and heading (angle of the INS velocity vector on horizontal navigation plane).
   (Option E) Similar to option D, where the INS user velocity may be included in the measurement equation in the form of speed and heading; but only the INS user speed (magnitude of the INS velocity vector on horizontal navigation plane) included in the measurement equation.

(Option E) Similar to option D, where the INS user velocity may be included in the measurement equation in the form of speed and heading; but only the INS user heading (angle of the INS velocity vector on horizontal navigation plane) is included in the measurement equation.

In one embodiment of the invention, the inertial measurement unit (IMU) provides 3-dimensional navigation information in local navigation frame, i.e., in NED (north, east, and down). The following three rows are added to the measurement equation (4) for the stand-alone GNSS receiver:

$$\begin{bmatrix} \dot{n}_D \\ \dot{e}_D \\ \dot{d}_D \end{bmatrix} = C^n_{e,3\times 3} \begin{bmatrix} \dot{x} \\ \dot{y} \\ \dot{z} \end{bmatrix} + \begin{bmatrix} v_n \\ v_e \\ v_d \end{bmatrix} \quad (14)$$

where $\dot{n}_D$, $\dot{e}_D$, and $\dot{d}_D$ are north, east, and down component, respectively, of the user velocity obtained using the IMU output. And $C^n_{e,3\times 3}$ is a 3×3 coordinate transformation matrix (from ECEF to local navigation frame).

$$C^n_{e,3\times 3} = \begin{bmatrix} -\sin(\phi)\cos(\lambda) & -\sin(\phi)\sin(\lambda) & \cos(\phi) \\ -\sin(\lambda) & \cos(\lambda) & 0 \\ -\cos(\phi)\cos(\lambda) & -\cos(\phi)\sin(\lambda) & -\sin(\phi) \end{bmatrix} \quad (15)$$

where $\phi$ and $\lambda$ are the latitude and the longitude of the user position (this can be obtained directly from the previous position estimate). $[v_n, v_e, v_d]^T$ models the measurement noise (here zero-mean Gaussian random variances with variances $E[v_n^2]=E[v_e^2]=E[v_d^2]=\sigma_D^2$ are assumed, although in practice this need not be strictly true).

For example, when the number of satellites available is four ($N_{SV}=4$), the measurement matrix of the EKF is given by:

$$H = \begin{bmatrix} H_{4\times 4} & 0_{4\times 4} \\ \hline 0_{4\times 4} & H_{4\times 4} \\ \hline 0_{3\times 4} & C^n_{e,3\times 3} \mid 0_{3\times 1} \end{bmatrix} \quad (16)$$

where $H_{4\times 4}$ is the 4×4 matrix consisted of the first four rows and the first four columns of H shown in (6).

A second embodiment considers the cases where the IMU provides 2-dimensional navigation information in local horizontal plane (in North and East), or only the 2-dimensional information is reliable even though 3-dimensional navigation is provided by the IMU. The following two rows are added to the measurement equation (4) for the stand-alone GNSS receiver:

$$\begin{bmatrix} \dot{n}_D \\ \dot{e}_D \end{bmatrix} = C^n_{e,2\times 3} \begin{bmatrix} \dot{x} \\ \dot{y} \\ \dot{z} \end{bmatrix} + \begin{bmatrix} v_n \\ v_e \end{bmatrix} \quad (17)$$

where $\dot{n}_D$ and $\dot{e}_D$ are north and east component, respectively, of the user velocity obtained using the IMU output. And $C^n_{e,2\times 3}$ is a 2×3 coordinate transformation matrix (from ECEF to local navigation frame) that consisted of the first two rows of (15):

$$C^n_{e,2\times 3} = \begin{bmatrix} -\sin(\phi)\cos(\lambda) & -\sin(\phi)\sin(\lambda) & \cos(\phi) \\ -\sin(\lambda) & \cos(\lambda) & 0 \end{bmatrix} \quad (18)$$

$[v_n, v_e]^T$ models the measurement noise (here zero-mean Gaussian random variances with variances $E[v_n^2]=E[v_e^2]=\sigma_D^2$ are assumed, although in practice this need not be strictly true).

For example, when the number of satellites available is four ($N_{SV}=4$), the measurement matrix of the EKF is given by:

$$H = \begin{bmatrix} H_{4\times 4} & 0_{4\times 4} \\ \hline 0_{4\times 4} & H_{4\times 4} \\ \hline 0_{2\times 4} & C^n_{e,2\times 3} \mid 0_{2\times 1} \end{bmatrix} \quad (19)$$

Another embodiment is the same as the second embodiment above except with one more constraint that the vertical component of the user velocity is zero. The following three rows are added to the measurement equation (4) for the stand-alone GNSS receiver:

$$\begin{bmatrix} \dot{n}_D \\ \dot{e}_D \\ 0 \end{bmatrix} = C^n_{e,3\times 3} \begin{bmatrix} \dot{x} \\ \dot{y} \\ \dot{z} \end{bmatrix} + \begin{bmatrix} v_n \\ v_e \\ v_d \end{bmatrix} \quad (20)$$

where $C^n_{e,3\times 3}$ is given in (15).

For an additional embodiment, the following two rows are added to the EKF measurement equation (4) for the stand-alone GNSS receiver:

$$s_D = \sqrt{\dot{n}_u^2 + \dot{e}_u^2} + v_s, \quad (21)$$

$$\psi_D = \text{atan2}\left(\frac{\dot{e}_u}{\dot{n}_u}\right) + v_\psi, \quad (22)$$

where $s_D$ and $\psi_D$ are the speed and the heading from IMU, respectively; and $v_s$ and $v_\psi$ model the measurement noise (here zero-mean Gaussian random variances with variances $E[v_s^2]=\sigma_s^2$ and $E[v_\psi^2]=\sigma_\psi^2$ are assumed, although in practice this need not be strictly true). And $$\begin{bmatrix} \dot{n}_u \\ \dot{e}_u \end{bmatrix} = C^n_{e,2\times 3} \begin{bmatrix} \dot{x} \\ \dot{y} \\ \dot{z} \end{bmatrix}. \quad (23)$$

The linearized measurement model is given as follows.

$$s_D = \left[0, \ 0, \ 0, \ 0, \ c_{11}\frac{\dot{n}_u}{s_u} + c_{21}\frac{\dot{e}_u}{s_u}, \right. \quad (24)$$
$$\left. c_{12}\frac{\dot{n}_u}{s_u} + c_{22}\frac{\dot{e}_u}{s_u}, \ c_{13}\frac{\dot{n}_u}{s_u} + c_{23}\frac{\dot{e}_u}{s_u}, \ 0, \right] x + v_s$$

-continued $$\psi_D = \left[0, \ 0, \ 0, \ 0, \ c_{11}\frac{-\dot{e}_u}{s_u^2} + c_{21}\frac{\dot{n}_u}{s_u^2}, \right. \tag{25}$$
$$\left. c_{12}\frac{-\dot{e}_u}{s_u^2} + c_{22}\frac{\dot{n}_u}{s_u^2}, \ c_{13}\frac{-\dot{e}_u}{s_u^2} + c_{23}\frac{\dot{n}_u}{s_u^2}, \ 0\right]x + v_\psi$$

For example, when the number of satellites available is four, the measurement matrix is the same as in (24) with two more rows:

$$H_{9,:} = \left[0, \ 0, \ 0, \ 0, \ c_{11}\frac{\dot{n}_u}{s_u} + c_{21}\frac{\dot{e}_u}{s_u}, \right. \tag{26}$$
$$\left. c_{12}\frac{\dot{n}_u}{s_u} + c_{22}\frac{\dot{e}_u}{s_u}, \ c_{13}\frac{\dot{n}_u}{s_u} + c_{23}\frac{\dot{e}_u}{s_u}, \ 0,\right]$$

$$H_{10,:} = \left[0, \ 0, \ 0, \ 0, \ c_{11}\frac{-\dot{e}_u}{s_u^2} + c_{21}\frac{\dot{n}_u}{s_u^2}, \right. \tag{27}$$
$$\left. c_{12}\frac{-\dot{e}_u}{s_u^2} + c_{22}\frac{\dot{n}_u}{s_u^2}, \ c_{13}\frac{-\dot{e}_u}{s_u^2} + c_{23}\frac{\dot{n}_u}{s_u^2}, \ 0\right]$$

where $H_{k,:}$ is the $k^{th}$ row of matrix H; $c_{ij}$ is the (i,j) component of $C_{e,2\times3}{}^n$ which is given in (23); and $s_u = \sqrt{\dot{n}_u^2 + \dot{e}_u^2}$.

This embodiment allows for the characterization of speed and heading separately. For accelerometer plus e-compass configuration, generally the speed estimation (using accelerometer) is more reliable than the heading estimate from e-compass (since e-compass heading suffers from local magnetic disturbance).

An additional embodiment, only speed measurement given in (26) is added to the EKF measurement equation (4) for the stand-alone GNSS receiver. And the linearized measurement model is given in (24). This option works also for accelerometer-only configuration.

For yet an additional embodiment, only heading measurement given in (22) is added to the EKF measurement equation (4) for the stand-alone GNSS receiver. And the linearized measurement model is given in (25).

For all the embodiments described above, the standard extended Kalman filtering equations given in (7) is followed.

Balancing Between GNSS and IMU

Blending filter is so flexible that the following options are allowed:

Selective IMU Integration: The integration filter is configured as a stand-alone GNSS position engine and does not integrate said INS measurements when GNSS measurements are reliable (when GNSS signal condition is good). For the GNSS signal condition, any metric for GNSS signal quality can be used. One example could be the number of satellites whose signal level with respect to noise level is greater than a threshold (number of available satellites). The other example is GNSS position or velocity uncertainty metric.

Continuous GNSS/IMU Integration: The measurement noise variances (per SV) for GNSS measurement are determined based on the signal quality. The measurement noise is time-varying and location-dependent. For example, it is high in bad signal condition (e.g., blockage, multipath). The measurement noise variance for INS user velocity data could be determined based on the followings: accuracy of sensors, mounting condition of IMU, and dynamics of the receiver, etc. Or, the measurement noise variance for INS user velocity may be set to be a constant (not changing over time). By these, the integration filter (EKF) balances between GNSS and IMU by itself. That is, more weight on IMU when GNSS signal is not good.

Field Test Result

Figure 3:
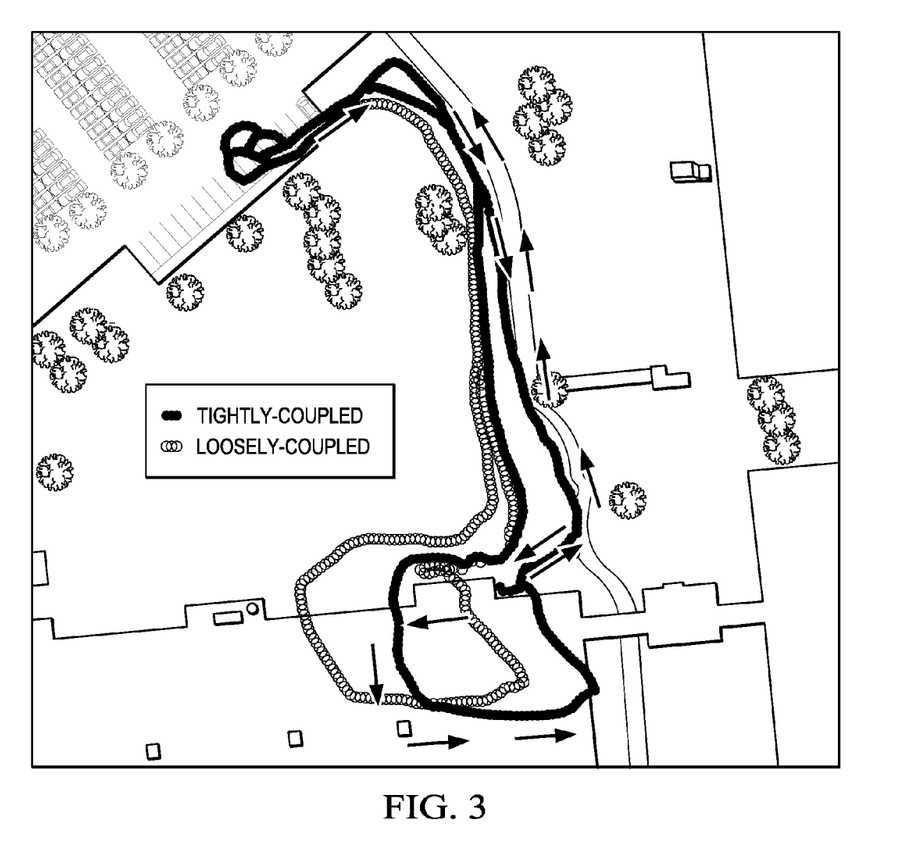
FIG. 3 shows field test results for pedestrian applications.
Figure 4:
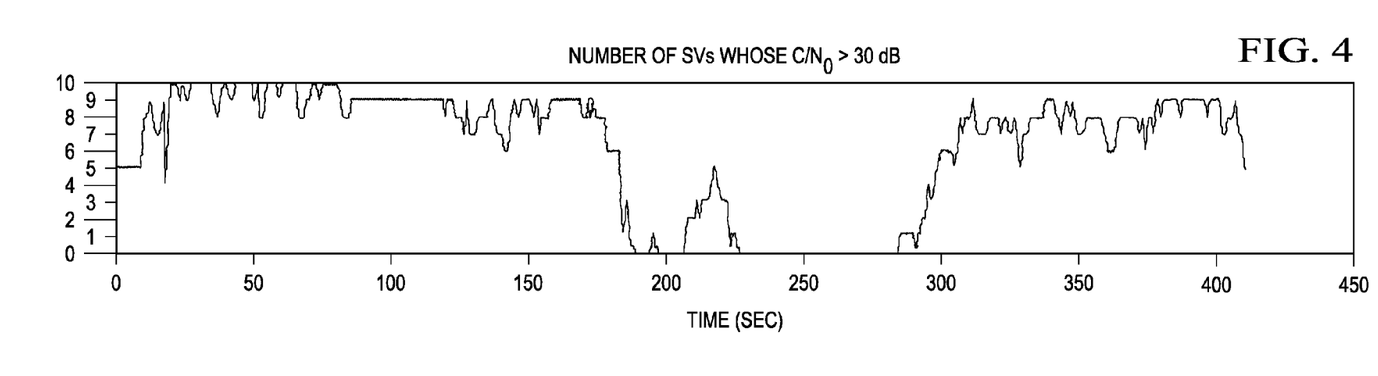
FIG. 4 is a graph presenting the availability of GPS satellites during the field test shown is FIG. 3.

FIG. 3 shows field test results for pedestrian applications (one path is from the proposed GNSS/IMU integration filter as disclosed for second embodiment at paragraph [0042]). An IMU (which contains low-cost 3-axis accelerometer and 3-axis magnetometers) was used along with a Texas Instruments (Dallas, Tex.) GPS solution NL5350 field trial box. The IMU was attached to the user waist. The test walk started outside of a building where GPS signal condition is good, and the user walked into the building where most of satellite signals are blocked (see FIG. 4 for GPS signal availability). In the test, the user walked along a rectangular-shaped route inside the building more than 100 seconds, and returned to the starting point outside the building (arrows in the figure show the actual test route). The tightly-coupled blending filter performs in reasonable accuracy in GPS blockage. FIG. 4 is a graph presenting the GPS signal availability (the number of GPS satellites whose $C/N_0$ is greater than 30 dB) during the field test shown is FIG. 3.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. Applicants specific define "plurality" to mean 1 or more.

What is claimed is:

1. An apparatus comprising:
    an integration filter for a sensor-assisted global navigation satellite system (GNSS) receiver of a satellite, wherein a state definition and a system equation of said integration filter is the same as those of a stand-alone GNSS position engine, but a plurality of measurements from said INS can be added in a measurement equation of said integration filter to have a blended navigation information;
    a GNSS measurement engine for providing GNSS measurement data to said integration filter;
    an inertial measurement unit (IMU); and
    an inertial navigation system (INS) block for calculating navigation information using a plurality of inertial sensor outputs, wherein integration filter processes an INS user velocity data from said INS in said measurement equation of said integration filter using a method comprising:
    a plurality of INS measurements in a local navigation coordinate are included in said measurement equation such that said INS measurements are a function of velocity variables of an integration filter state with a plurality of measurement noises.

2. The apparatus of claim 1, wherein said inertial sensors in said IMU is selected from the list consisting of:
    accelerometer;
    magnetometer; and
    gyroscope.

3. The apparatus of claim 1, wherein said integration filter performs a blending operation for combining said GNSS measurement data and said INS navigation information.

4. The apparatus of claim 1, wherein said integration filter is selected from the list consisting of:
    a Kalman Filter,
    a Linearized Kalman Filter (LKF),
    an Extended Kalman Filter (EKF),
    an Unscented Kalman Filter (UKF),
    a particle filter,
    a least squares filter, and
    an intelligent/learning filter.

5. The apparatus of claim 1, wherein said measurement data comprises a pseudorange measurement and a delta range measurement for at least one satellite.

6. The apparatus of claim 1, wherein said measurement engine providing a measurement noise variance for said pseudorange measurement and said delta range measurements.

7. The apparatus of claim 1, wherein said inertial navigation system (INS) block calculates said INS user velocity data using a plurality of inertial sensor outputs, and provides said INS user velocity data to said integration filter.

8. The apparatus of claim 7, wherein said INS user velocity data from said INS is synchronized to GNSS measurement data.

9. The apparatus of claim 7, wherein INS providing measurement noise variance for said INS user velocity data.

10. The apparatus of claim 1, wherein a vertical INS measurement from said plurality of INS measurements is set to zero.

11. The apparatus of claim 1, wherein said INS measurement includes a speed measurement using a magnitude of an INS velocity vector on horizontal navigation plane.

12. The apparatus of claim 1, wherein said INS measurement includes a heading measurement using an angle of said INS velocity vector on horizontal navigation plane.

13. The apparatus of claim 1, wherein said INS measurement includes a speed measurement using a magnitude of an INS velocity vector on horizontal navigation plane and a heading measurement using an angle of said INS velocity vector on horizontal navigation plane.

14. The apparatus of claim 3, wherein said integration filter is configured as a stand-alone GNSS position engine and does not integrate said INS measurements when GNSS measurements are reliable depending on a GNSS signal condition.

15. The apparatus of claim 14, wherein said GNSS signal condition metric is the number of GNSS satellites whose signal level with respect to noise level is greater than a threshold.

16. The apparatus of claim 14, wherein said GNSS signal condition metric is GNSS position uncertainty metric.

17. The apparatus of claim 14, wherein said GNSS signal condition metric is GNSS velocity uncertainty metric.

18. The apparatus of claim 3, wherein said integration filter uses a plurality of time-varying measurement noise variances for said GNSS measurements and said INS measurement in calculating said blended navigation information.

19. The apparatus of claim 18, wherein said measurement noise variances per a satellite vehicle (SV) for GNSS measurement are determined based on a GNSS signal quality, wherein said measurement noise is time-varying and location-dependent.

20. The apparatus of claim 19, determination of said measurement noise variances for said INS measurement is based on a subset from the group consisting of:
   an accuracy of sensors,
   a mounting condition of IMU, and
   a plurality of dynamics of said receiver.

21. The apparatus of claim 3, wherein said measurement noise variance for said INS measurement is set to a constant (not time-varying) and said INS measurement is used in calculating said blended navigation information.

22. The apparatus of claim 1, wherein said INS is a motion detector operable to provide motion information of user.

23. The apparatus of claim 22, wherein said motion detector determines when said user is stationary or has negligible motions, and wherein zeros are used in the INS user velocity data with a plurality of low measurement variances.

24. The apparatus of claim 22, wherein said when motion detector determines when said user is in motion, said integration filter is configured as stand-alone GNSS position engine and does not integrate said INS measurements.

25. A method of blending velocity data from an inertial navigation system (INS) of a satellite in a measurement equation of global navigation satellite system/inertial measurement unit GNSS/IMU integration filter, said method comprising:
   creating a coordinate transformation matrix with a plurality of measurement noises;
   including a plurality of INS measurements in a local navigation coordinate in said measurement equation such that said INS measurements are a function of a plurality of velocity variables of an integration filter state with said plurality of measurement noises; and
   outputting a blended position fix.

26. The method of claim 25, wherein a vertical INS measurement in said plurality of INS measurements is set to zero.

27. The method of claim 25, wherein said INS user velocity data includes a speed measurement using a magnitude of an INS velocity vector on an horizontal navigation plane.

28. The method of claim 25, wherein said INS user velocity data includes a heading measurement using an angle of said INS velocity vector on an horizontal navigation plane.

29. The method of claim 25, wherein said INS user velocity data includes a speed measurement using a magnitude of an INS velocity vector on horizontal navigation plane and a heading measurement using an angle of said INS velocity vector on an horizontal navigation plane.

30. The method of claim 25, wherein integration filter is configured as a stand-alone GNSS position engine and does not integrate said INS measurements when said GNSS measurements are reliable depending on a GNSS signal condition.

31. The method of claim 25, further comprising determining a measurement noise variance per a satellite vehicle (SV) for GNSS measurement based on a signal quality, wherein said measurement noise is time-varying and location-dependent.

32. The method of claim 30, wherein a determination of said measurement noise variance for an INS user velocity issues information selected from the group consisting of:
   an accuracy of sensors,
   a mounting condition of said IMU, and
   a plurality of dynamics of said receiver.

* * * * *